March 5, 1963 D. L. JAFFE ETAL 3,080,483

INFRARED SIGNAL GENERATOR

Filed March 26, 1959 6 Sheets-Sheet 1

INVENTORS
D. LAWRENCE JAFFE
ALAN ROSS
BY Darby & Darby
ATTORNEYS

INFRARED SIGNAL GENERATOR

Filed March 26, 1959

6 Sheets-Sheet 2

INVENTORS
D. LAWRENCE JAFFE
ALAN ROSS
BY
Darby + Darby
ATTORNEYS

INVENTORS
D. LAWRENCE JAFFE
ALAN ROSS
BY
Darby & Darby
ATTORNEYS

INFRARED SIGNAL GENERATOR

Filed March 26, 1959 6 Sheets-Sheet 4

INVENTORS
D. LAWRENCE JAFFE
ALAN ROSS
BY
Darby & Darby
ATTORNEYS

INFRARED SIGNAL GENERATOR

Filed March 26, 1959 6 Sheets-Sheet 5

INVENTORS
D. LAWRENCE JAFFE
ALAN ROSS
BY
Darby & Darby
ATTORNEYS

INVENTORS
D. LAWRENCE JAFFE
ALAN ROSS
BY
Darby & Darby
ATTORNEYS

United States Patent Office 3,080,483
Patented Mar. 5, 1963

3,080,483
INFRARED SIGNAL GENERATOR

David Lawrence Jaffe, Great Neck, and Alan Ross, Bayside, N.Y., assignors to Polarad Electronics Corporation, Long Island City, N.Y., a corporation of New York Filed Mar. 26, 1959, Ser. No. 802,094
24 Claims. (Cl. 250—84)

The present invention relates to an infrared signal generator and more particularly to an infrared signal generator capable of generating essentially monochromatic signals of accurately known characteristics and power levels and which infrared signal generator is adjustable over a wide frequency range and power levels.

With the increasing use of precision and sensitive infrared equipment in control, measuring and tracking fields, accurate and correct reading of the infrared transmission and reception equipment is of paramount importance. Also, accurate infrared signal generation equipment is essential for many test operations and laboratory measurements, and new uses for this type of equipment are constantly being found.

The present invention provides a device useful for evaluation, measurement, calibration and adjustment of all types of infrared equipment, such as transmitters, detectors, and test equipment, that will give simply and quickly absolute and relative measurements of detectivity, sensitivity, signal-to-noise ratio, frequency characteristics, frequency response, etc.

It is generally desired that an infrared signal generator provide an output signal controllable both in frequency (or wave length) and in power, and furthermore, that the frequency and power may be set to respective desired values with a minimum of difficulty. In the utilization of such a signal generator it is often desired to make observations for a series of different values of frequency or of power, or both. In the course of such observations it is important to maintain continuously the frequency and power outputs at the desired levels. For example, if it is desired to make a series of observations for different frequency outputs at a constant power level, it is important that the power level be maintained constant and that a continuous indication be provided so that a continuous check may be maintained on the power level. Oftentimes it is desirable to have the infrared signal radiation modulated, such as sine or square wave modulation, and to have this characteristic precisely known.

While these characteristics are desirable in infrared signal generators, they were almost unattainable, since the required measurements were difficult or impossible to make directly in conventional infrared signal generators.

Obtaining the output signal having the frequency or wave length desired required the use of a double monochromator, which due to the criticalness of precise alignment created tracking problems and often proved unreliable in field use. The conventional double-monochromator heretofore used consisted of two identical prisms ganged to a common drive shaft and dial, and utilized focusing mirrors and narrow slits in the entrance and exit of both prisms. If the unit was correctly aligned, the output radiation was practically free of unwanted frequencies; nevertheless, this conventional system had several disadvantages, which were especially applicable if the system was incorporated into a unit subject to "rough" usage such as use in the field. The proper tracking of the two prisms is extremely critical, since any misalignment results in attenuation of the desired signal.

Heretofore, to secure a high-power, infrared source, an excessively high radiator temperature was necessary, thereby radiating undesirable visible light. Further, conventional methods of securing a beam of infrared radiation were not acceptable for precision signal generation since the density of the output radiation beam varied. Formerly, a source of infrared energy utilized a small hot object placed at the focal point of a parabolic mirror, which mirror focused the radiant energy into a parallel beam in which the density varied as the inverse of the fourth power of the distance from the center of the beam. The resultant output beam of variable density was not suitable for use in precision signal generating application.

Heretofore, monochromatic infrared signals were not directly calibrated in absolute power due to the difficulty of measuring broad band monochromatic radiation power. To measure monochromatic power radiation, not only must the emissivity of the measuring device be as high as possible but it must be constant over the entire band.

Therefore, it is an object of the present invention to provide an infrared signal generator capable of generating essentially monochromatic radiant energy of accurately known frequency, power and modulation characteristics which is continuously and directly adjustable throughout the frequency range of the instrument.

It is another object of the present invention to provide an infrared signal generator having means for continuously checking the absolute power output of the device.

It is still another object of the present invention to provide an infrared signal generator having a source of infrared radiation which produces a high-power, collimated signal using a relatively low temperature radiator.

A further object of the present invention is to provide a relatively low temperature infrared source having a high-power output with broad-band parallel beam radiation of uniform density.

It is a still further object of the present invention to provide an infrared signal generator having an output signal of substantially monochromatic wave length directly adjustable throughout the range of the generator, whereby an output of high signal purity is obtained.

A further object of the present invention is to provide a monochromator unit using a single prism, that rejects almost all undesired radiation while providing good resolution.

A still further object is to provide a signal generator having a monochromatic unit which is entirely free of slits, lenses and focusing mirrors and provides a numerical aperture approaching unity.

Still another object of the present invention is to provide an infrared signal generator wherein the power output may be attenuated by adjusting a direct reading attenuator dial, which attenuation is accurate throughout the frequency range of the infrared signal generator.

It is a still further object of the present invention to provide an infrared signal generator wherein the power output radiation is in collimated form and capable of being directed through a range of horizontal directions relative to the generator.

A still further object is to provide an infrared signal generator having an output radiation in collimated form capable of having its output radiation signal in the form of a point source of radiation of known radiancy.

In is a further object of the present invention to provide an infrared signal generator having a signal output that may be unmodulated, or square wave or sine wave modulated through a predetermined frequency range directly controllable by the operator.

A further object of the present invention is to provide an infrared signal generator which accomplishes all of the above and which is compact and sturdy in construction, accurate and reliable in use, simple and easy to operate, and readily and economically manufactured and serviced.

Other objects and features of the invention will be apparent when the following description is considered in connection with the annexed drawings in which.

Figures 1, 2, 3:
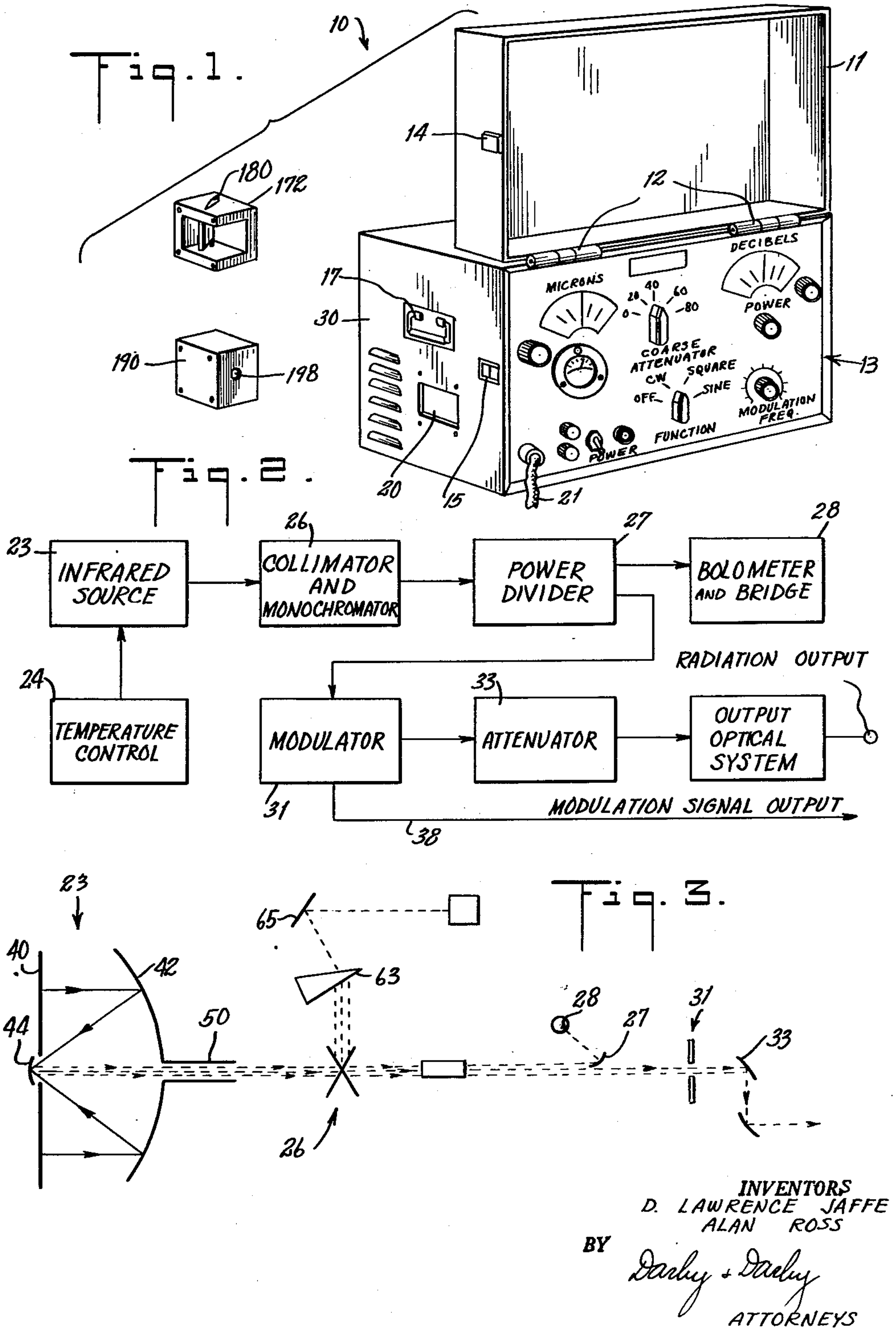
FIG. 1 is a perspective view of the outer configuration of one form of an infrared signal generator according to the present invention.
FIG. 2 is a block diagram of the present invention.
FIG. 3 is a schematic plan view of the infrared signal generator of FIG. 1, indicating the path of the rays.
Figure 8A:
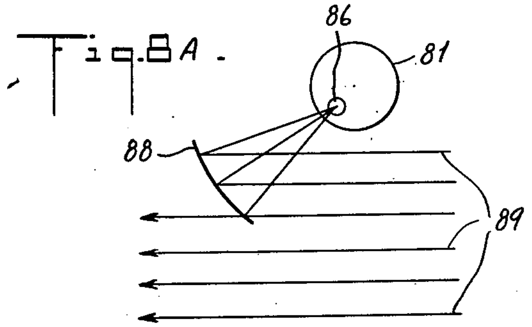

FIG. 8*a* is a diagram showing the paths of typical rays incident to and reflected from the power divider as used in the signal generator shown in FIG. 1.

Figures 7, 8:
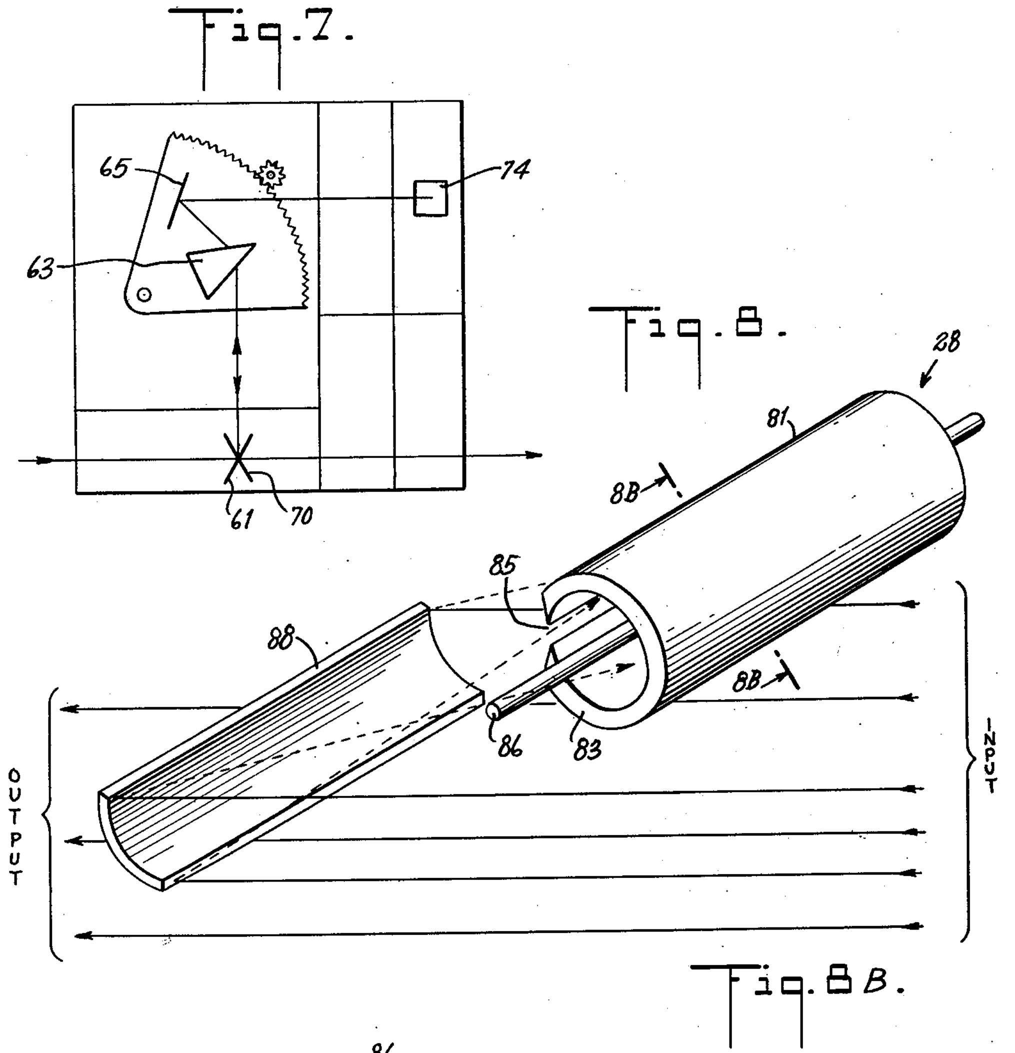
FIG. 7 is a detailed plan view of the monochromator unit used in the infrared signal generator shown in FIG. 1.
FIG. 8 is an enlarged diagrammatic view of one form of a power divider and bolometer mount showing the paths of typical rays of the output radiation, according to the present invention.
Figure 8B:
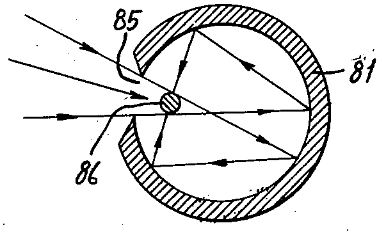

FIG. 8*b* is a cross-sectional elevational view taken along line 8*b*—8*b* of FIG. 8.

Figures 9, 10:
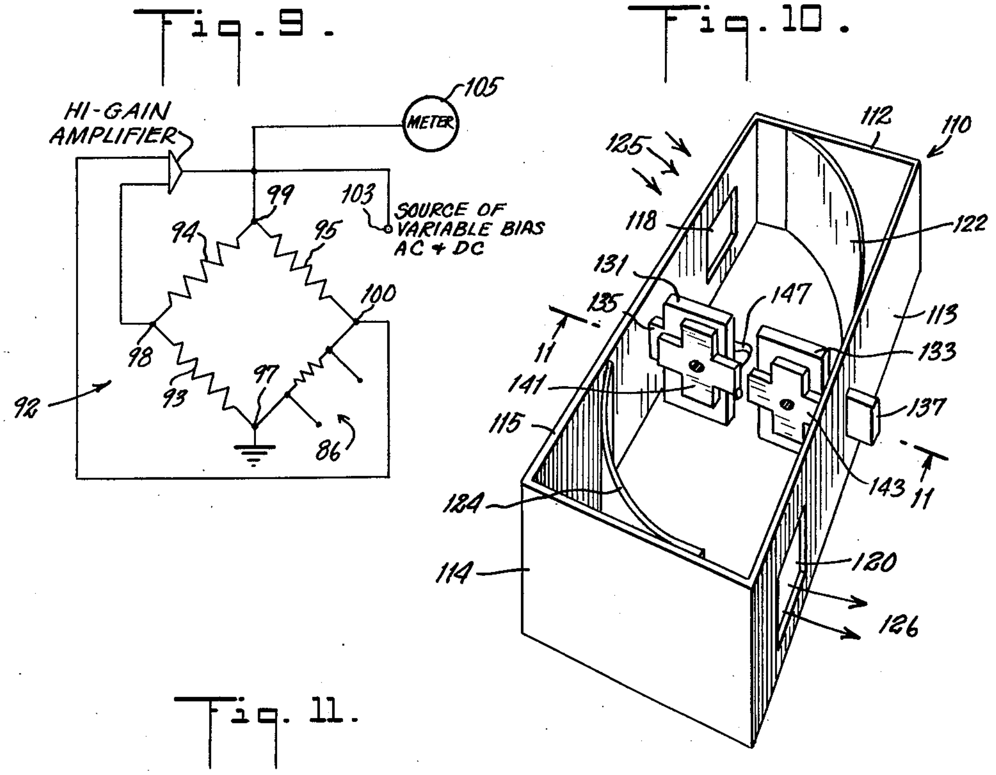

FIG. 9 is a schematic circuit diagram of a bridge circuit useful in conjunction with the present invention.

FIG. 10 is a perspective plan view, partially broken away, of one form of a unit having attenuator means and sine and square wave modulation means.

Figures 11, 12:
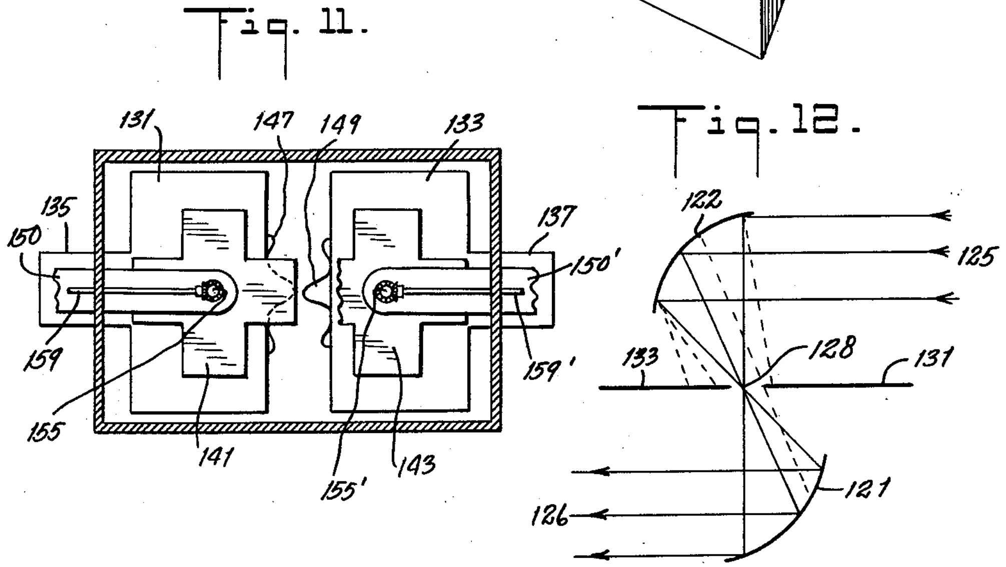

FIG. 11 is a transverse fragmentary cross-sectional view taken along line 11—11 of FIG. 10.

FIG. 12 is a schematic diagram showing the paths of typical rays through the unit shown in FIG. 10.

Figure 13:
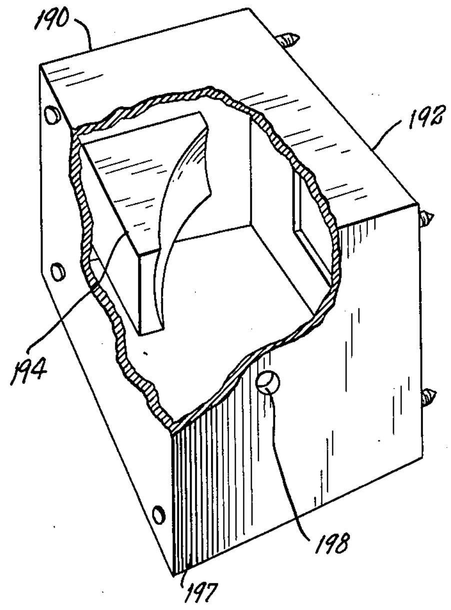

FIG. 13 is a perspective elevational view, partially broken away, of one form of a point source attachment to the device shown in FIG. 1.

Figure 14:
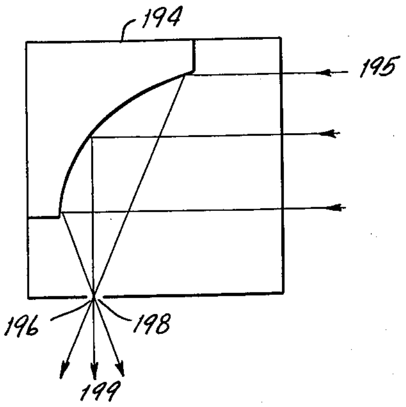

FIG. 14 is a schematic diagram showing the paths of typical rays through the device shown in FIG. 13.

Figure 15:
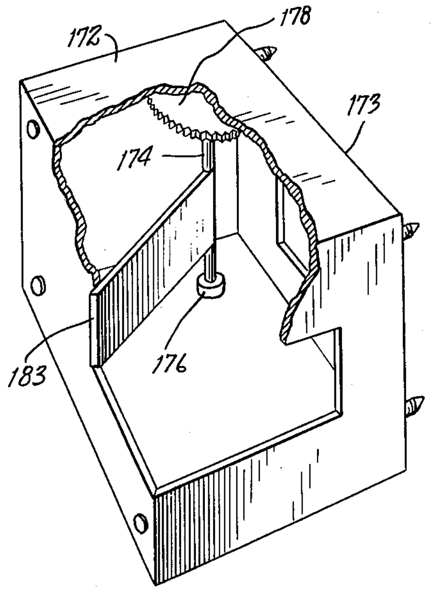

FIG. 15 is a perspective elevational view, partially broken away, of one form of a collimated radiation attachment for directing the collimated output through a range of horizontal directions for use in conjunction with the device shown in FIG. 1.

Figure 16:
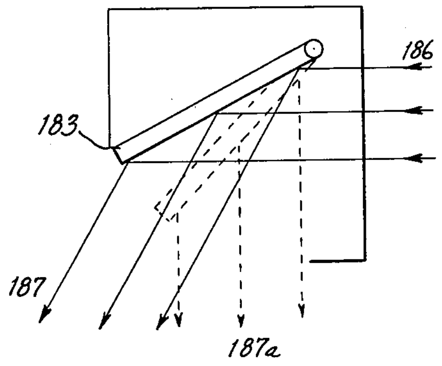
Figure 17:
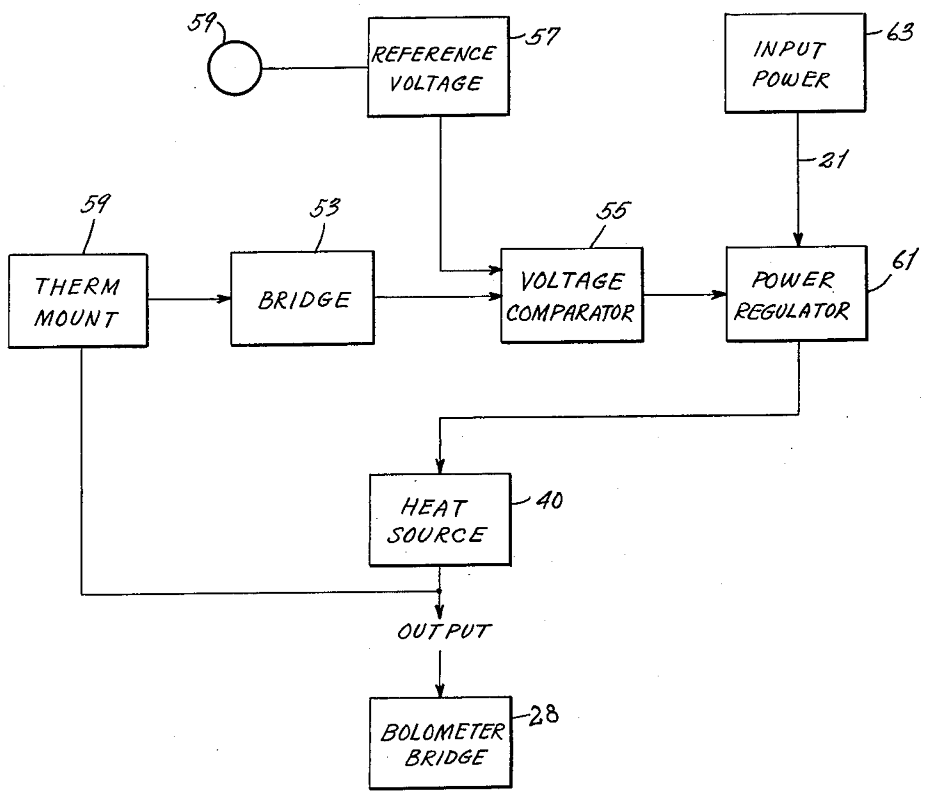

FIG. 16 is a schematic diagram of the paths of typical rays through the device shown in FIG. 15; and FIG. 17 is a schematic block diagram of a circuit useful in conjunction with the present invention.

The present invention relates to an infrared signal generator capable of generating essentially monochromatic radiant energy of accurately known frequency, power and modulated characteristics which is adjustable within the frequency range of the instrument and is directly calibrated for these characteristics. The embodiment, designated generally at 10 and shown in FIG. 1, covers the range of 0.75 to 15 microns (wave length), which covers the near and intermediate infrared regions. While certain values are given for the embodiment described hereinafter, these are not meant in a limiting sense, since these values are illustrative only.

The outer configuration of signal generator 10 is one form of the present invention particularly useful in performing both laboratory and field work. The unit is compact, portable and adapted to be placed on a tripod for 360° rotation thereon. As seen in FIG. 1, a cover 11 is pivotally mounted in the upper front edge of the unit 10 about a pair of hinges 12 for exposing the work face 13 when cover 11 is in its open position, as shown, or completely protecting work face 13 when closed. Cover 11 can be locked in closed position by means of a snap-catch arrangement in which a projecting lug 14 on both sides of cover 11 is fixedly held by a latch 15 when cover 11 is in closed position. A handle 17 is mounted on both sides of unit 10 for ease in carrying unit 10. Front or work face 13 of unit 10 has the various dials, switches, plugs, meters and controls for using and operating it, as will be discussed hereinafter. The output radiation of infrared signal generator 10 leaves via window 20 in one side panel 30 of unit 10, as seen in FIG. 1. Infrared signal generator 10 receives its input power through suitable connections to an outside electrical source (not shown) via conductor 21. The infrared signal generator described below can be operated with an input voltage varying from 95 to 130 volts having a freqency from 55 to 65 cycles per second. Infrared signal generating unit 10 has accessory units 172 and 190 which are adapted to be removably mounted on panel 30 over window 20 to vary or change the form or direction of the output radiation signal, as will be discussed hereinafter.

The present invention may best be explained by first referring to diagrams of an infrared signal generator according to the present invention as illustrated in FIGS. 2 and 3. A source of radiant energy 23 produces a collimated beam of high-power, uniform density radiation over the freqency range desired. Infrared source 23 radiates a constant power output despite any input voltage fluctuations or ambient temperature changes by means of a temperature control monitor 24. The broad-band collimated output radiation of infrared source 23 is double passed through a monochromator unit 26 to provide a relatively pure source of radiation signal. Monochromator unit 26 is adjustable over the frequency range of infrared signal generator instrument 10 to provide a substantially pure output signal having the desired wave length. In one embodiment of the present invention, the desired wave length of the output signal can be obtained with accuracy of + or —.01 micron. A predetermined percentage of the output from monochromator unit 26 is continuously monitored by means of a power divider 27 and a bolometer mount 28 with a suitable measuring circuit to give an absolute power reading so that a constant reference level can be maintained. If desired, the continuous wave output signal can be shaped into a square or sine wave modulated output signal by suitable modulator means 31 over a range of frequency. Also, if desired a modulation voltage signal 38 in phase with the modulation used may be supplied to external equipment such as synchronous detectors. The power level of the output signal is adjustable by means of a directly calibrated attenuator unit 33, so that the output level can be set rapidly at the exact value desired. In one embodiment of the present invention the output signal can be attenuated over a range from 0 to 120 decibels to within an accuracy of + or —1 decibel. The output signal of the desired frequency having a known power level (watts per unit area) is radiated from the unit in a collimated beam form through window 20 in panel 30 of generator unit 10. If desired, the collimated output can be directed through a range of horizontal directions relative to side panel 30 by mounting accessory unit 172 over window 20 to receive the output radiation. Further, if desired, the output radiation can be a point source of radiation of known radiancy (watts per solid angle), by mounting accessory unit 190 over window 20 to receive the output signal.

Figures 4, 5, 6:
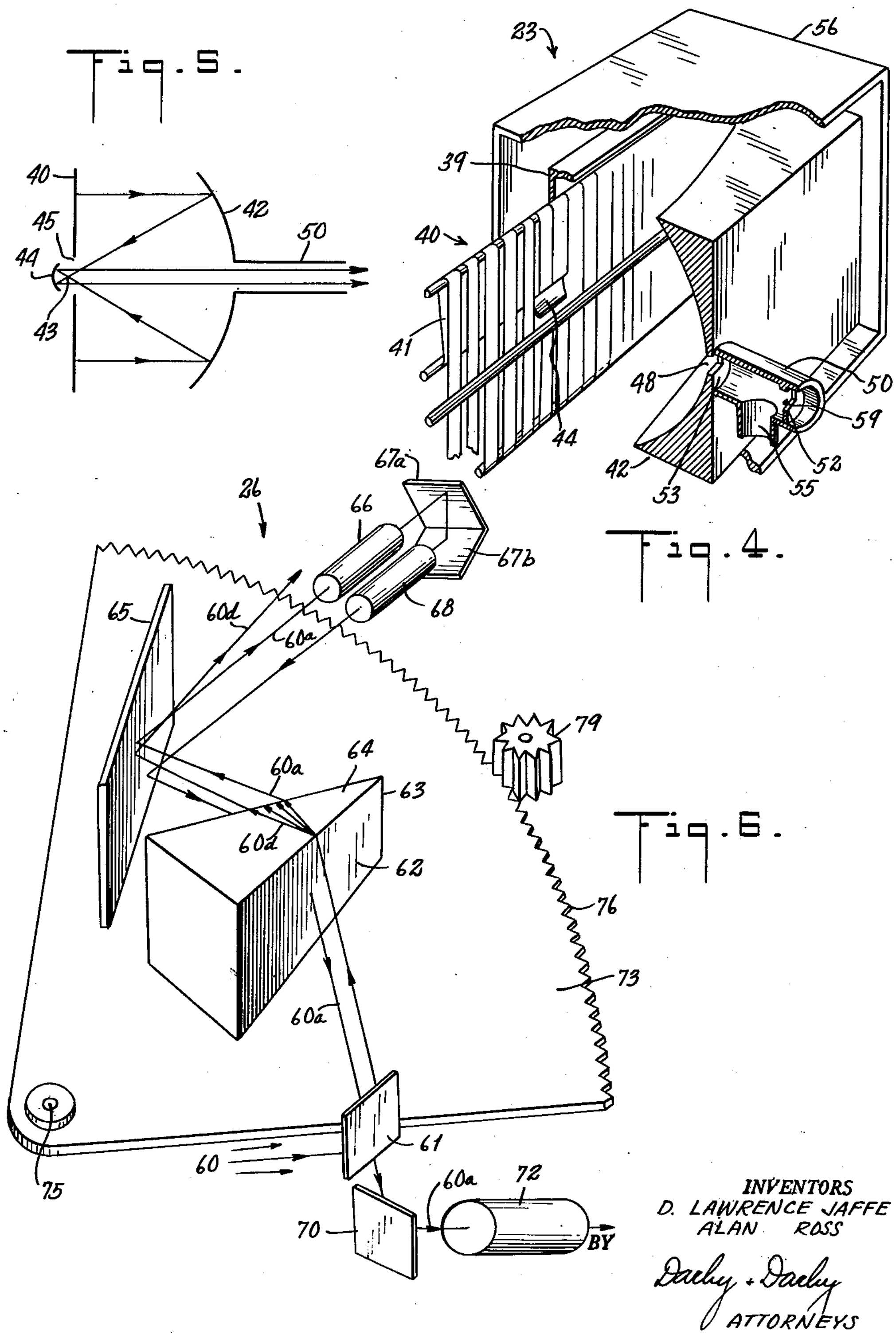
FIG. 4 is a schematic, perspective view of a source of infrared radiation according to the present invention.
FIG. 5 is a diagram showing the paths of typical rays in the infrared source of FIG. 4.
FIG. 6 is a schematic diagram of one form of a double pass monochromator unit according to the present invention.

Infrared source 23 is shown best in FIGS. 4 and 5. The source of radiant energy is preferably a planar surface 40 having a relatively large area. A satisfactory source of radiant energy consists of a fine tape-wounc resistant material, indicated at 41, which is blackened by metallic oxide for maximum radiant emittance. While the radiant source is indicated as being in the form of tape, it is not so restricted, since it could be in the form of a coil, a single resistance wire, or any other material suitable for giving the desired radiation covering the wave length band desired. Surface 40 has a central opening therein, 45. As shown in FIG. 5, radiant energy emitted from radiator 40 is collected by primary concave parabolic reflector 42 which has a radiation-gathering area equal to the area of radiator 40. Parallel to and facing primary parabolic reflector 42 and coaxial thereto is a smaller secondary concave parabolic reflector 44 having a shorter focal length than primary reflector 42. Reflectors 42 and 44 are so positioned that they have a common focal point 43. Reflector 44 is disposed to the rear of source 40 and coaxial to opening 45 therein.

Preferably, the ratio of the focal lengths of conjugate reflectors 42 and 44 is made equal to the ratio of their diameters, so that all the radiation parallel to the axis of reflector 42 and collected by reflector 42 will be focused to pass through focal point 43 and be collected by secondary reflector 44 and reflected therefrom in a substantially parallel beam as indicated by the arrows, representing pencils of rays, in FIG. 5. Since the total energy reflected from secondary parabolic reflector 44 in a parallel beam is substantially equal to the total energy of the parallel rays incident to and collected by primary reflector 42, it is seen that the energy density leaving the secondary parabolic refector 44 is increased over the energy density received by primary reflector 42 by the inverse ratio of the areas. This is shown by:

$$\frac{\text{output energy}}{\text{input energy}}=\frac{\text{watts out/inch}^2}{\text{watts in/inch}^2}$$

$$=\frac{\text{output area}}{\text{input area}}=\frac{(\text{focal length in})^2}{(\text{focal length out})^2}$$

An example of this is as folllows: If primary reflector 42 has a 10 inch focal length and secondary reflector 44 has a 0.5 inch focal length, the ratio is:

$$\frac{(\text{focal length in})^2}{(\text{focal length out})^2}=\frac{10^2}{(0.5)^2}=\frac{100}{0.25}=400$$

It is seen that a source radiating only 0.25 watt per inch, ten inches in diameter can produce an output energy density of 100 watts per square inch. Such a source would require only an operating temperature of about 1300° F. (dull red), while a source hot enough to produce an energy density of 100 watts per square inch directly must have a temperature of over 5000° F., which is beyond the melting point of most metals, besides being uneconomical.

As is known, the radiation from a plane surface has components in all angular directions within the hemisphere it faces. The total radiated power from a surface if finite area at a constant temperature is proportional to the area of the source. This may be stated mathematically as:

$$W_t=dW_tA$$

where $W_t$=total power at all frequencies radiated into a hemisphere facing and completely surrounding the area in question.

$dW_t$=total power radiated by a differential area into a similar hemisphere.

$A$=finite area of surface in question.

Stefan's law states that:

$$W_t=\alpha A(T_s^4-T_h^4)$$

where $W_t$=total power at all frequencies radiated into a hemisphere facing and completely surrounding the area in question.

$A$=area.

$T_s$=source-temperature in degrees Kelvin.

$T_h$=ambient temperature in degrees Kelvin.

$\alpha$=Stefan's constant=$5.672\times10^{-12}$ watts/degree$^4$.

As is known, the radiation per unit solid angle from a plane surface (or small differential area) varies as the cosine of the angle made with the normal to the surface. This is known as Lambert's cosine law.

The power within a cone of included angle $\theta$ around the perpendicular can be shown to be:

$$dW_c=dW_t\sin^2\left(\frac{\theta}{2}\right)$$

where $dW_c$=power radiated by a differential area $dA$ into a cone of included angle $\theta$.

$dW_t$=total power radiated by a differential area.

$\theta$=included angle of cone around the normal to the surface which passes through $dA$.

For small angles only a small percentage of the total energy is involved. Typically, for 10 degrees the total power within a cone of an included angle of 10 degrees would be less than 1% of the total available radiation.

Further, it is seen that a perfectly collimated beam would contain no power. Thus it is necessary to make a compromise between "sufficient collimation" and "sufficient power." In this specification, "collimated radiation" will refer to a beam of small included angle.

With the present construction the use of a small included angle, with attendant small values of $dW_c/dW_t$, a large majority of the unused radiation is reflected back to the source and is reabsorbed by the source, hence making an efficient thermal system. It should be noted that by placing reflector 44 behind radiator 40, almost all of the radiation reflected by reflector 42 not properly focused will be reabsorbed by radiator 40. Also, it is desirable to dispose behind radiator 40 a planar reflector 39 to reflect back to reflector 40 all rearward radiation.

Concentric to the conjugate axes of primary reflector 42 and secondary reflector 44 is an opening 48 in primary reflector 42. Mounted on the rear surface of primary parabolic reflector 42 and concentric with opening 48 therein is a collimating tube 50 having a plurality of plates therein, of which two, 52 and 53, are shown. Collimating tube 50 eliminates by reflection and/or absorption all radiation which is not sufficiently collimated. Plates 52 and 53 have preferably rectangular openings concentric to opening 48 in primary reflector 42 to provide rectangular symmetry of the source output. Collimating tube 50 may be separate from reflector 42 or made integral thereto if desired. As mentioned above, most of the unwanted, uncollimated radiation is intercepted by primary reflector 42 and reflected back to source 40 where the energy is reabsorbed.

The surface of primary reflector 42 is cooled sufficiently by air drawn around the edges thereof and exhausted through opening 48 into collimating tube 50 and out through an opening 55 which is substantially perpendicular to the axis of collimating tube 50. Surrounding and enclosing infrared source 23 is a housing 56 of unit 10 which minimizes the cooling by convection of source 23.

For proper functioning of infrared signal generator unit 10, the temperature of radiant energy source 40 must remain substantially constant. Fluctuations in operating temperature of source 40 would cause fluctuations in the power output or radiant emittance as well as the primary frequency or wave length of the radiation of radiator 40. Therefore, some means to maintain a constant temperature of infrared source 40 is important for proper operation. One such method is placing a temperature-sensitive electrical resistive element, such as a thermistor 59, in the output path of radiation from radiator 40, shown in FIG. 4 positioned in collimating tube 50. Thermistors of this type are commercially available with very small dimensions, having a diameter of .030 inch and with lead wires of the order of one mill in diameter which form sensitive temperature-variation detecting elements. The small size of the thermistic body prevents appreciable distortion of any temperature effects created in the collimating tube, and also the small size of the coupling wire minimizes any possible disturbances in the output radiation. The thermistor is attached in some manner to the collimating tube's inner surface, such as by any desired type of cement or adhesive, preferably using one with reasonably good heat insulation properties. While a thermistor is mentioned, other temperature- or power-sensitive devices may be used by those skilled in the art.

FIG. 17 shows a circuit in which thermistor 59 may be utilized. Thermistor 59, which is the power-sensitive element and hence disposed in the path of radiation from radiant energy source 40, is placed in one arm of a bridge circuit 53. The output of bridge circuit 53 is fed into a voltage comparator 55. A reference voltage source 57 is also fed into voltage comparator 55. The output of reference voltage source 57 can be varied by suitable control means indicated at 59. Voltage comparator 55, in a manner well known to the art, compares the two input signals and supplies an indication of whether the output from bridge 53 is in agreement or disagreement with the output from reference voltage source 57. The output from the voltage comparator 55 is fed to a power regulator unit 61. Also, power regulator unit 61 receives via conductor 21 the input power designated at 63 of the infrared signal generator unit. Power regulator unit 61 operates to correct or limit the deviation of the power to radiant energy source 40. By means of a feedback signal circuit, the output power from source 40 is maintained constant over a wide range of input power line voltage and ambient temperatures. All of the above equipment is well known in the art and forms no part of the present invention. Other means to control the heat source may be used.

The arrangement discussed above provides a constant standard output for all wave lengths across the output band of the infrared signal generator. The absolute power output is controlled by varying the reference voltage source 57 by means of control knob 59 to control the feedback signal circuit. Control 59 of the reference voltage source 57 is used by the operator to set the output of infrared source 40 to a predetermined level.

Bridge 53 is initially balanced. When radiant energy source 40 is operating, thermistor 59 is heated. The heating of a thermistor varies its resistance, thence unbalancing bridge 53. The degree of unbalance of bridge 53 is necessarily dependent upon the range and resistance of the thermistor 50, which in turn is dependent upon the heating of it caused by the instant power impinging thereon. This unbalance is hence a measure of the power output of the unit. The output of bridge 53 shortly becomes equal to the reference voltage signal due to the feedback signal. With the circuit of FIG. 17, the power output signal of bridge 53 is proportional to the reference voltage source 57. Thus, the temperature of the radiator is maintained at a constant output level.

The output signal of infrared source 23 is received by monochromator unit 26 for selecting the signal having the desired frequency which is to be passed. Monochromator unit 26 is adapted to transmit only a narrow pass band of radiation and consequently transmits a beam of high purity. As shown best in FIGS. 6 and 7, monochromator unit 26 double-passes the input signal through a single prism and avoids using precision focusing mirrors, lenses and narrow slits, which heretofore were required, thereby reducing the power through the monochromator unit. As discussed above, the output energy from infrared source 23 is in the form of a parallel beam of radiant energy in a continuous band over the entire frequency range of the unit. Disposed in the path of the collimated beam of radiation emerging from collimating tube 50, indicated by a single ray 60 in FIG. 6, is a fixedly mounted planar mirror 61. Planar mirror 61 reflects the beam of energy to fall on a face 62 of a prism 63 which deviates the beam of energy in a well known manner. The beam of radiant energy leaving prism 63 will be dispersed over an angle determined by the index of refraction of the material from which the prism is made and the prism angle. Since the deviation produced by prism 63 increases with increasing index of refraction, the shorter wave lengths are deviated most. On emerging from face 64 of prism 63, the radiation is spread out into a fan-shaped beam of rays, according to frequency or wave length. However, all the rays at any one frequency will be parallel as the input radiation. The output radiation from face 64 of prism 63 is incident to a planar reflector 65 and the beam of radiation is reflected therefrom at an angle equal to the angle of incidence. A collimating tube 66 is disposed in the path of the radiation reflected from planar reflector 65, which permits only those rays within a small included angle reflected from mirror 65 to pass, indicated illustratively as ray *60a*, whereas ray *60d* is reflected from mirror 65 at an angle too great to be received by collimating tube 66. The collimated radiant energy output from collimating tube 66 is reflected by means of mirrors *67a* and *67b* substantially 180° into a further collimating tube 68 which is substantially parallel to collimating tube 66. Other means for exactly reversing the direction of the radiation may be used, such as a "Porro" type of reflecting prism. The collimated radiant energy output from collimating tube 68 is incident the planar reflecting surface 65 and reflected therefrom to strike face 64 of prism 63 and pass back through prism 63 with the radiation being dispersed again according to wavelength. The fan-shaped beam emanating from face 62 of prism 63 (of which only *60a* is shown) is incident to planar reflector 70. The rays are reflected from reflector 70 at an angle equal to their angle of incidence. Only those rays within a narrow bandwidth of frequencies pass through a further collimating tube 72, thus providing a substantially monochromatic collimated radiation output. Mirrors 61, 65, *67a*, *67b* and 70 are utilized to minimize the overall size of the monochromator unit. Corresponding rays of entrant and re-reflected beams through prism 63 and incident to and reflected from planar reflector 65 lie in substantially the same vertical plane. Prism 63 and mirror 65 are fixedly mounted in relation to each other on a rotating table 73 pivoted about a point 75. The outer edge of table 73 has gear teeth 76 cut therein. A drive gear wheel 79 of relatively small diameter having mating teeth moves table 73 about pivoting point 75 accurately since a large movement of gear wheel 79 only moves table 73 through a relatively small angle. Gear wheel 79 is coupled to controls on the front panel of unit 10, which in turn are coupled to a direct reading dial that reads in microns. Mirror 65 is so positioned with respect to the output radiation from prism 63 that a minimum deviation ray, *60a*, entering prism 63 is reflected from mirror 65 at substantially right angles thereto.

Infrared radiation source 23 emits a broad band of radiation and forms a continuous spectrum over the frequency range of the unit. This beam is dispersed by prism 63, with the various wave lengths present in the beam of radiation being deviated by different angles so that a continuous spectrum of rays is obtained. Collimating tube 66 only passes a narrow band of wave lengths, thereby isolating radiation having the desired frequency range. This sequence is repeated in the second passage through prism 63 of the radiation, and collimating tube 72 further isolates the desired frequency range. Upon rotation of table 73, various portions of the continuous spectrum leaving prism 63 are isolated by collimating tubes 66 and 72, thereby securing a substantially monochromatic output radiation. With the monochromator unit shown in FIG. 6, rotating gear wheel 79 rotates prism 63 and planar reflector 65 and simultaneously adjusts both passages of the radiation.

It is desirable to rigidly mount monochromator unit 26 in a single casting, as shown in FIG. 7. Folded collimating tubes 66 and 68 with reflectors 67*a* and 67*b* are indicated as a unit at 74. Since the only optical materials practical at infrared wavelengths are water soluble, it is preferable that the unit be hermetically sealed to prevent any moisture from coming into contact with the prism and thereby damaging it.

While a prism was shown as the dispersing element in the preferred embodiment of the monochromator unit, other means for dispersing a beam into spectra may be used such as a diffraction grating. Also, other means for rotating prism 63 may be devised by those skilled in the art.

Measurement of the power level of the radiation leaving monochromator unit 26 is made preferably by recording the heating effect on a temperature sensitive resistive element known as a bolometer. In the present embodiment, a constant reference level is continuously maintained by using a bolometer 28 and a power bridge network.

Applicant has found that for best results the power monitor must be a device which is sensitive to absolute power, independent of the thermistor or bolometer coefficient and resistance, and independent of ambient temperature, relative humidity and other similar effects. In FIG. 8 there is shown one form of a bolometer mount particularly useful according to the present invention. A substantially cylindrical, tubular member 81 has a highly reflective inner surface 83. An entrance slit 85 running longitudinally along the length of tubular body 81 provides an entrance to the inner cavity of member 81. Disposed longitudinally within tubular member 81 is a sensing element 86 supported in any convenient manner, such as by insulating beads or supports not shown. Sensing element 86 preferably is a length of fine platinum wire, which has been suitably blackened, providing a positive temperature coefficient. A wire that has been found to give satisfactory results has a diameter of about 10 thousandths of an inch.

Disposed in the output path of radiation designated generally as 89 from collimating tube 72 of monochromator unit 26 is a substantially parabolic reflector 88 which, as seen in FIGS. 8 and 8*a*, is adapted to intercept a fixed percentage of the output radiation. As seen in FIG. 8*a*, a multiplicity of individual rays 89 from monochromator unit 26 have a fixed proportion thereof intercepted by reflector 88. Slit or opening 85 of tubular member 81 is positioned to receive the beam reflected from reflector 88. Disposed substantially at the focal plane of reflector 88 is sensing element 86. As seen in FIG. 8*b*, reflected and other stray radiant energy entering through entrance slit 85 and not initially absorbed by sensing element 86 is re-reflected by the mirror-like inner surface 83 of tubular body 81 until this energy is absorbed by element 86 or escapes through slit 85. Only a very small percentage of the energy entering tubular body 81 escapes through slit 85. The shape of the cylindrical curve of the cavity or the inner surface 83 of tubular body 81 is not critical, since almost all of the received energy is re-reflected until it is absorbed by sensing element 86, due to the relatively small area of entrance slit 85.

The emissivity of the bolometer structure described above is constant throughout the span of wavelengths to be emitted by the infrared signal generator and by using the above described structure, the emissivity is thus made very high. The cooling of sensing element 86 due to radiation is greatly reduced by the reflecting action of inner surface 83 of the cavity. If desired, entrance slit 85 may be sealed by means of a thin window, which is permeable to radiation over the entire output wavelength band of infrared signal generator 10 and the cavity tubular body 81 evacuated so as to eliminate any cooling effects due to convection.

FIG. 9 shows a circuit in which the bolometer mount of FIGS. 8 and 8*b* may be utilized with sensing element 86 forming one arm of a bridge network.

As is well known, to measure input power various ways of calibrating an instrument utilizing a bridge circuit may be used. The instrument may be calibrated by measuring the unbalance of the bridge when the input power is introduced or by using a substitution method, where the bridge is rebalanced by withdrawing bias power, in which case the power introduced is equal to the bias power withdrawn. Applicant has found that the substitution and self-balancing methods are more accurate than other measuring means since they do not rely on the resistance power law of the bolometer used. The used of a self-balancing bridge maintains bolometer sensing element 86 at a constant value of resistance hence at a constant temperature. Since the radiation power received by the bolometer is a function of the temperature difference between the source and the bolometer, the accuracy of the measurement is enhanced because the temperature of sensing element 86 is constant.

FIG. 9 shows a self-balancing power bridge 92, where the substitution of an A.C. power is done automatically and a direct reading of the power is instantly obtained. Sensing element 86 is shown as the fourth arm of bridge 92 in FIG. 9. With no infrared input power applied to bolometer mount 75, bridge 92 is initially balanced by superimposed D.C. bias power and A.C. or audio power. The radiation reflected from reflector 88 is directed on element 86, which unbalances the bridge. The bridge 92 is automatically rebalanced by keeping the D.C. or the bias power constant and reducing the audio power. The incoming power is just equal to the difference between the original audio power and the new audio power.

Referring more specifically to FIG. 9, there is shown a bridge network 92 consisting of three resistive elements 93, 94 and 95 connected between terminals 97—98, 98—99, 99—100, respectively, and sensing element 86 is connected between terminals 97 and 100. A bias of superimposed D.C. and A.C. or audio power is applied to terminals 99 and 97 from a variable bias source indicated at 103. Bridge 92 is automatically maintained in continuous balance by feedback techniques well known in the art. Bridge 92 is arranged to provide positive feedback. In the oscillatory state, the condition of $A\beta=1$ is satisfied where:

A is the amplifier gain; and
$\beta$ is the feedback factor.

Since the only variable element is the bolometer resistance, the audio power will automatically assume a level to produce the required $\beta$. The resistance of the adjacent bridge arms is chosen to produce the proper impedance. By directing the unknown infrared radiation on sensing element 86, the audio power is reduced by an equal amount as a result of the self-balancing action of the system. This change in audio power may be measured by a suitable indicating instrument or meter 105. No tuning is necessary with the above network and it measures the power within the full frequency range of bolometer 28.

Since the bridge network 92 is always balanced, the impedance of sensing element 86 is constant and the power is simply proportional to the square of the audio voltage. Thus, meter 105 may be a simple vacuum tube voltmeter probably calibrated and may be used to read absolute power. Bias source 103 is used to set the level of the A.C. power initially for zero meter reading. It will be understood that the scale on meter 105 can be chosen or calibrated so as to read directly in decibels or milliwatts.

Other circuits may be used or devised by those skilled in the art and the specific type used forms no parts of the present invention.

For proper readings with a bridge network, the bolometer unit used, preferably should have several special properties. It should have a time constant long enough to respond only to root means square values of the alternating current impressed upon it and not the instantaneous value. Further, sensing element 86 should be completely resistive and have an impedance which is reasonably low and reproducible. As mentioned above, the effective emissivity of unit 28 must be constant and independent of the radiation input frequency.

While the preferred construction of sensing element 86 used a fine platinum wire, other materials may be used, such as a thermistor made of a small bead of semiconducting material having a negative temperature coefficient.

The output radiation from infrared signal generator 10 may be directly adjusted to the output power level desired by means of varying a calibrated attenuator unit. Since the infrared signal generator unit 10 produces an output radiation over a broad frequency band, preferably lens and "f-stop" techniques for attenuating the output are used. It is desirable that the lenses be of the reflective type, since the variation of focal length with frequency of the transmission type lenses would cause serious errors.

One form of an attenuator unit is shown in FIGS. 10, 11 and 12. A light tight box 110, generally rectangular in shape, has sides 112, 113, 114 and 115, respectively. Side 115 has a substantially rectangular input opening 118 adjacent side 112. Similarly, side 113 has a substantially rectangular output opening 120 adjacent side 114. Disposed within housing 110 are a pair of cylindrical parabolic focusing mirrors 122 and 124. Mirror 122 abuts the inner surfaces of sides 112 and 113 and is adapted to receive the radiation entering opening 118. Similarly, mirror 124 is disposed abutting the inner surfaces of walls 114 and 116 adapted to receive the radiation reflected from mirror 122. Opening 120 in wall 113 is so placed to pass the rays reflected from mirror 124 as indicated by arrows 126 in FIG. 10. Preferably, mirrors 122 and 124 are identical, off-axis parabolic concave cylindrical mirrors. Housing 110 is of a length and reflectors 122 and 124 are so oriented therein that they have a common focal point indicated at 128 in FIG. 12. As diagrammatically seen in FIG. 12, input radiation, in the form of parallel rays 125, strikes parabolic mirror 122 whereby the radiation is focused at point 128 and then directed to parabolic reflector 124 and the beam is reflected in parallel ray substantially parallel to the input radiation but displaced therefrom.

Box 110 has a pair of two substantially parallel and coplanar blades 131 and 133 slidably positioned therein for forming an opening therebetween. Preferably, blades 131 and 133 lie in the focal plane 128 of reflectors 122 and 124. Blades 131 and 133 are movable along their respective axes to adjust the opening between their adjacent vertical edges so as to control the area through which the radiation passes and thereby control the flow of radiation passing therebetween. Due to various factors, such as imperfections of the surface of reflector 122, misalignment, nonparallel input radiation, etc., the radiation reflected from reflector 122 is not focused into a line 128 as indicated in FIG. 12, but instead is focused into a band having a definite width as shown by the dotted lines. Due to the reflected beam covering a band at focal point 128, the blades are placed at the common focal point where they intercept sufficient radiation for suitable attentuation. If desired, the blades 131 and 133 may be positioned intermediate of reflectors 122 and 124 and the focal point 128 with suitable adjustments for calibration being made. As shown in FIGS. 10 and 11, blades 131 and 133 have extending arms 135 and 137, respectively, passing through walls 115 and 113, respectively. By suitable drive mechanisms not shown, coupled to arms 135 and 137, blades 131 and 133 are symmetrically opened and closed. This mechanism is coupled to a dial on the front face of unit 10 calibrated in milliwatts and/or decibels so that a direct reading of the power output is obtained. Thus, by a simple, directly controllable movement, the flux density or power per unit area of the radiation leaving attenuating unit 110 is controlled.

Provision is made to modulate the output signal, if desired, into a sine or square wave over a wide range of frequency.

One form of modulating the output signal is shown in FIGS. 10 and 11 where modulation of the continuous wave output is provided by rotating disk modulator wheels having their peripheries serrated to the shape of the desired modulation wave form. As seen in FIG. 10, two pairs of coplanar wheels 141 and 143, and 147 and 149, are mounted parallel and adjacent to a surface of blades 131 and 133, respectively. Coplanar wheels 141 and 143 have their edges serrated in the shape of a square wave, and coplanar wheels 147 and 149 have their peripheries serrated in the shape of a sine wave. Wheels 141, 143, 147 and 149 are spaced from their respective adjacent surfaces of blades 131 and 133, and are planarly movable relative to one another so as to increase or decrease the space between their peripheral surfaces, as well as being entirely retractable when modulation of the output wave is not required. Each wheel is rotatably mounted on movable arms extending through the walls 113 and 115 and suitably coupled to drive mechanisms for movement, as is well known in the art. The manner of mounting is the same for all the wheels and only the mechanism in connection with wheel 141 will be discussed with similar numerals referring to similar elements being used with respect to wheel 143 except they will be primed. As seen in FIG. 11, an arm 150 is shown, to which wheel 141 is rotatably mounted. Wheel 141 is fixedly mounted on a shaft 155 which is turn is rotatably supported by arm 150 in suitable bearing means. The end of shaft 155, opposite wheel 141, has bevel gear teeth around the outer periphery. Supported by arm 150 is a shaft 159, adapted to be rotated by suitable means not shown. Shaft 159 has a bevel gear mounted on its end corresponding to and mating with the gear attached to shaft 155. Upon rotation of shaft 159, wheel 141 rotates. Shaft 159 is suitably coupled to a speed control motor, not shown, in a manner well known in the art. The angular rotation of the speed control motor is controlled by means of a knob on the front panel of infrared signal generating unit 10, thus giving the operator a direct control over the frequency of the modulation of the output wave. With one embodiment the freqeuncy range of the modulation was from 10 to 1000 cycles per second, although other frequencies may be used, if needed. The number of shaped teeth on the outer periphery of the wheels determines the angular speed at which the wheels rotate to obtain the desired frequency of modulation. However, the space between the teeth should be preferably large in relation to the wave length of the unmodulated wave. While FIGS. 10 and 11 show a certain number of teeth on wheels 141 and 143, this is illustrative only and the number may be varied with suitable changes made in the angular speed of the wheels. It is desirable that the teeth on the wheels be of sufficient size that a mating pair of said teeth cover the entire space between blades 131 and 133. Each pair of wheels, 141 and 143, and 147 and 149, are synchronized so that the spaces between the respective teeth are aligned in passing the space between the blades 131 and 133. To secure a better shaped wave, wheels 141 and 143 preferably rotate in opposite directions so that the steepness of the leading and trailing edges of the pulse are increased. However, normally the steepness of the leading and trailing edges of the wave is not critical. If desired, the pairs of serrated wheels may be mounted in individual housings, and mounted separate from attenuator unit 110. While one method of mounting and rotating modulating wheels 141, 143, 147 and 149 is shown, other may be devised and used by those skilled in the art.

The output 126 from attenuator unit 110 passes through opening 120 in collimated form and leaves unit 10 via a window 20 in panel 30. If desired, the parallel output radiation may be directed through a range of horizontal directions relative to panel 30.

As shown in FIGS. 15 and 16, a casing 172 having opening 173 therein, is adapted to be mounted to the outer surface of panel 30 by suitable fastening means, such as snap fasteners. Casing 172 has an opening 173 in its rear wall having an area equal to opening 20 and upon casing 172 being mounted to side panel 30 of unit 10, wall opening 173 and window 20 are aligned. A shaft 174 is vertically mounted in casing 172. The bottom end of shaft 174 is mounted in a step bearing 176 and the upper end of the shaft 174 is fixedly secured to a gear wheel 178 which wheel is transverse to the axis of shaft 174. Wheel 178 is rotated by means of a knob 180 extending from the upper surface of casing 172, as shown in FIG. 1. Fixedly secured to shaft 174 and extending perpendicular thereto is a planar reflector 183 which is adapted to be disposed in the path of radiation received through opening 173. As seen in FIG. 16, by rotating reflector 183 in the path of radiation through window 173, the input radiation indicated at 186 is reflected at varying angles from the incident radiation. As seen in FIG. 16, when mirror 183 is positioned as shown, output radiation 187 is reflected from mirror 183 at a certain angle equal to the angle of incident radiation 186. Upon rotating mirror 183 to the position indicated by the dotted lines, the reflected radiation 187*a* is reflected at a different angle since the angle of the incident radiation 186 with respect to reflector 183 has changed. The operator by rotating knob 180 can deflect a parallel beam of uniform radiation at known watts per units area through a relatively large change of direction in the horizontal plane.

If desired, the output radiation from unit 10 can be in the form of a point source of radiation of known radiancy, of watts per solid angle. As seen in FIGS. 13 and 14, a casing 190 has an opening in the rear surface corresponding in area to output opening 20 in side panel 30 of unit 10. Upon casing 190 being mounted to the side panel of infrared unit 10 by any well known fastening means, such as snap fasteners, opening 192 and window 20 in unit 10 are aligned and correspond. Disposed in casing 190 in the corner opposite opening 192 is a concave parabolic reflector or mirror 194 having its surface adapted to receive the parallel input radiation through opening 192. As seen in FIG. 14, the input radiation, indicated by numeral 195, strikes the surface of mirror 194 and is focused at a point 196. Panel 197 of casing 190 is coplanar with focal point 196 of mirror 194 and has an aperture 198 therein, which aperture 198 is coaxial to focal point 196. As seen in FIG. 14, the output radiation designated by numeral 199 emanates from a point source 196.

The infrared signal generator described above is capable of generating an essentially monochromatic signal of accurately known characteristics and power levels adjustable anywhere within the frequency range of the instrument. After the infrared unit is connected to a suitable source of electrical power, the proper dials on the front face of the instrument are easily set by the operator to obtain an output signal having the desired frequency at the desired power level, in a variety of forms.

Infrared source 23 radiates a high-power, uniform density beam throughout the entire frequency range of instrument 10. Temperature control 24 automatically keeps the power output from source 23 at a constant level regardless of variations in ambient temperature and fluctuations in input voltage. The uniform high density, broad band beam of mixed radiation is received by monochromator unit 26. Movement of the frequency or wavelength control on the front face of unit 10 rotates table 73, thereby moving prism 63 and mirror 65 and passing only the radiation at the desired frequency level. The frequency control has a dial setting aligned with movement of table 73 so that the dial reading corresponds with the frequency of the band that is passed by monochromator unit 26. A predetermined portion of the output from monochromator unit 26 is fed to bolometer 28 by power divider 27. A bridge circuit 92, in which the sensing element of the bolometer is one arm, provides a continuous reading of absolute power. A knob on the control panel adjusts the distance between blades in attenuator unit 33, thus varying the area of the output radiation, and thereby positively controlling the power level of the output of unit 10. If desired, the attenuated output signal may be sine or a square wave modulated by moving rotating serrated pairs of coplanar wheels into the path of the output radiation. The serrations on the periphery of these wheels are cut substantially to sine or square wave shape, thereby providing sine or square wave modulation, respectively, to the output radiation. The speed of rotation of the wheels determines the frequency of modulation. The output radiation may be kept in the form of a parallel beam of radiation providing a signal of known watts per unit area or focused to a point source of radiation of known radiancy thus providing a radiancy of known watts per solid angle.

While this system is particularly adaptable to generate power at infrared frequencies, it is equally adapted for other frequencies.

It will be understood that the unit, while shown as portable, can be mounted in any other convenient form or made stationary, and while certain accessory units for use with the infrared signal generator have been described, other accessories may also be used.

By the term "thermistor," as used above, is meant any temperature-sensitive resistor and it could have either a positive or negative temperature coefficient.

While certain circuits have been described in connection with temperature control or measuring of the power output, other circuits may be used, all of which are well known in the art.

Accordingly, there has been described the convenient, accurate, rugged infrared signal generating unit, providing monochromatic signals in the near and intermediate infrared regions which are directly calibrated in both absolute power and wave length providing further sine or square wave modulation if desired as well as a variety of forms of the output radiation.

It will be understood that the foregoing description is illustrative only and many different structures are within the scope of the present invention defined only by the appended claims.

What is claimed is:

1. An infrared signal generator comprising a planar source of radiant energy, a first concave parabolic reflector facing said source and having a central aperture therein, said first reflector having a radiation gathering surface equal in area to the area of said planar source, a second concave parabolic reflector having a smaller focal distance than said first reflector and being coaxial to and facing said first reflector, said first and second reflectors having a common focal point, said first reflector collecting radiant energy from said source and reflecting it to said second reflector so that a high power uniform density beam of radiant energy emerges via said aperture in said first reflector, collimating means disposed to the rear of said first parabolic reflector and coaxial to the opening therein for passing a collimated beam of radiant energy, a prism, means operative to pass the collimated beam from said collimating means through said prism for dispersing the radiation therethrough, means oriented to receive and return only a small preselected portion of said dispersed beam to said prism for further dispersion of said beam, attenuating means including a pair of opposite plane surfaces having the properties of reflecting and absorbing substantial portions of incident radiant energy, means oriented to transmit as an emergent beam to said attenuating means a portion of the further dispersed beam from said prism, each of said surfaces of said attenuating means being movable relative to one another for controlling the output power of the beam of radiant energy, a calibrated indicator coupled to said attenuator, means for varying the ratio of movement of said plane surfaces of said attenuator unit to the movement of said indicator, a cylindrical tubular member having a reflective inner surface and a longitudinal opening therein, an energy receiving wire disposed longitudinally within said tubular member and adjacent said opening, reflector means oriented for receiving and reflecting through said opening in said tubular member a portion of the beam of radiant energy from said attenuating means, a portion of said radiant energy entering said tubular member impinging directly on said energy receiving wire and substantially all of the remaining portion of said received energy being reflected by the inner surface of said tubular member to impinge on said energy receiving wire, power indicating means electrically coupled to said energy receiving wire for providing a continuous indication of the absolute power level of the output signal whereby an essentially monochromatic signal of accurately known characteristics and power level is obtained.

2. A device as in claim 1 further including means for modulating the output signal of said infrared signal generator, said means including rotating disks disposed in a plane substantially perpendicular to the output radiation, said disks having serrated edges cut to the shape of the desired modulation wave form, and means to vary the speed of rotation of said disks.

3. An infrared signal generator comprising a planar source of radiant energy, a first concave parabolic reflector facing said source and having a central aperture therein, said first reflector having a radiation gathering surface equal in area to the area of said planar source, a second concave parabolic reflector having a smaller focal distance than said first reflector and being coaxial to and facing said first reflector, said first and second reflectors having a common focal point, said first reflector collecting radiant energy from said source and reflecting it to said second reflector so that a high power uniform density beam of radiant energy emerges via said aperture in said first reflector, collimating means disposed to the rear of said first parabolic reflector and coaxial to the opening therein for passing a collimated beam of radiant energy, a dispersing element, means operative to communicate the collimated beam from said collimating means to said dispersing element for dispersing the beam of radiation, means oriented to receive and return only a small preselected portion of said dispersed beam to said dispersing element, attenuating means including a pair of opposite plane surfaces having the properties of reflecting and absorbing substantial portions of incident radiant energy, means oriented to transmit as an emergent beam to said attenuating means a portion of the further dispersed beam from said dispersing element, each of said surfaces of said attenuating means being movable relative to one another for controlling the output power of the beam of radiant energy, a calibrated indicator coupled to said attenuator, means for varying the ratio of movement of said plane surfaces of said attenuator unit to the movement of said indicator, a cylindrical member having a longitudinal cavity therein with a reflective inner surface, said member having a longitudinal opening therein for receiving a portion of the emergent radiant energy beam, an energy receiving wire disposed longitudinally within said tubular member and adjacent said opening so that a portion of said energy entering said cylindrical member impinges directly on said energy receiving wire and substantially all of the remaining portion of said received energy being reflected by the inner surface of said tubular member to impinge on said energy receiving wire, power indicating means electrically coupled to said energy receiving wire for providing a continuous indication of the absolute power level of the output signal whereby an essentially monochromatic signal of accurately known characteristics and power level is obtained.

4. A device as in claim 3 further including means for directing the output beam of collimated radiant energy through a range of horizontal directions.

5. A device as in claim 4 wherein said directing means comprising a planar reflector pivotally mounted in the path of the emergent beam of radiant energy, means for fixedly positioning said reflector at predetermined positions in said emergent beam whereby the beam reflected from said reflector can be varied in a horizontal plane.

6. A device as in claim 3 further including means for converting the emergent beam of collimated radiant energy to a point source of known radiancy.

7. An infrared signal generator comprising a source of radiant energy, a first concave parabolic reflector facing said source and having a central aperture therein, said first reflector having a radiation gathering surface equal in area to the area of said source, a second concave parabolic reflector having a smaller focal distance than said first reflector and being coaxial to and facing said first reflector, said first and second reflectors having a common focal point, said first reflector collecting radiant energy from said source and reflecting it to said second reflector so that a high power uniform density beam of radiant energy emerges via said aperture in said first reflector, collimating means disposed to the rear of said first parabolic reflector and coaxial to the opening therein for passing a collimated beam of radiant energy, dispersing means oriented to receive and disperse the beam of collimated radiant energy from said collimating means so as to transmit only a small preselected portion of said dispersed beam, attenuating means, disposed in the path of said dispersed beam, a calibrated indicator directly coupled to said attenuator for reading the attenuation of the output beam of radiation, a member having a cavity therein with a reflective inner surface, said member having an axial opening therein, an energy receiving wire disposed within said tubular member and substantially parallel to and adjacent said opening so that a portion of the beam of radiant energy from said attenuating means, a portion of said energy entering said member impinges directly on said energy receiving wire and substantially all of the remaining portion of said received energy being reflected by the inner surface of said tubular member to impinge on said energy receiving wire, power indicating means electrically coupled to said energy receiving wire for providing a continuous indication of the absolute power level of the output signal whereby an essentially monochromatic signal of accurately known characteristics and power level is obtained.

8. A device as in claim 7 further including means for modulating the output signal of said infrared signal generator, said means including rotating disks disposed in a plane substantially perpendicular to the output radiation, said disks having serrated edges cut to the shape of the desired modulation wave form, and means to vary the speed of rotation of said disks.

9. A device as in claim 7 further including means for directing the output beam of collimated radiant energy through a range of horizontal directions.

10. A device as in claim 7 further including means for converting the emergent beam of collimated radiant energy to a point source of known radiancy.

11. An infrared signal generator comprising a source of collimated mixed radiant energy covering a predetermined frequency band, a prism, means operative to pass said collimated beam from said source through said prism for dispersing the radiation therethrough, means oriented to receive and return only a small preselected portion of said dispersed beam to said prism, attenuating means including a pair of opposite plane surfaces having the properties of reflecting and absorbing substantial portions of incident radiant energy, means oriented to transmit as an emergent beam to said attenuating means a portion of the further dispersed beam from said prism, each of said surfaces of said attenuating means being movable relative to one another for controlling the output power of the beam of radiant energy, a calibrated indicator coupled to said attenuator, means for varying the ratio of movement of said plane surfaces of said attenuator unit to the movement of said indicator, a cylindrical member having a longitudinal cavity therein with a reflective inner surface, said member having a longitudinal opening therein for receiving a portion of the emergent radiant energy beam, an energy receiving wire disposed longitudinally within said tubular member and adjacent said opening, so that a portion of said energy entering said cylindrical member impinges directly on said energy receiving wire and substantially all of the remaining portion of said received energy being reflected by the inner surface of said tubular member to impinge on said energy receiving wire, power indicating means electrically coupled to said energy receiving wire for providing a continuous indication of the absolute power level of the output signal whereby an essentially monochromatic signal of accurately known characteristics and power level is obtained.

12. An infrared signal generator comprising a mixed frequency band source of radiant energy covering a predetermined frequency spectrum, collimating means disposed in the path of said radiant energy for providing a parallel beam of radiation, frequency controlling means including a dispersing element disposed in the path of the entrant parallel beam of radiant energy for providing an essentially monochromatic emergent radiant energy signal, said entrant radiant energy beam being dispersed by said dispersing beam at least twice, means for attenuating the output beam of said generator disposed in the path of said emergent monochromatic signal, indicating means coupled to said attenuator for directly setting said attenuator, a temperature-sensitive electrical resistive element disposed in said collimated radiation for sensing power fluctuations in said emergent radiant energy beam, power indicating means electrically coupled to said power sensing means whereby an essentially monochromatic signal of accurately known characteristics and power levels, adjustable within the desired frequency range, is obtained.

13. A device as in claim 12 further including means for modulating the output signal of said infrared signal generator.

14. A device as in claim 13 wherein said modulating means comprises rotating disks disposed in a plane substantially perpendicular to the collimated output radiation beam, said disks having serrated edges cut to the shape of the desired modulation wave form, and means to vary the speed of rotation of said disks.

15. An infrared signal generator comprising a broad frequency band source of radiant energy, collimating means disposed in the path of said radiant energy for providing a parallel beam of radiation, frequency controlling means disposed in the path of said parallel beam of radiation for providing a substantially monochromatic output radiation signal, means for varying said frequency controlling means to select the desired frequency of the output signal, means for attenuating the output beam of said generator disposed in the path of said monochromatic signal, indicating means directly coupled to said attenuator for reading the setting of said attenuator means, power sensing means disposed in said collimated radiation, power indicating means electrically coupled to said power sensing means whereby an essentially monochromatic signal of accurately known characteristics and power levels, adjustable within the desired frequency range, is obtained.

16. An infrared signal generator comprising a source of collimated radiant energy covering a predetermined frequency band, a frequency control with a calibrated indicator to pass only a selected narrow frequency band of radiation so that the emergent beam is essentially monochromatic, means for varying the ratio of movement of said frequency control to the movement of said frequency control indicator for providing a direct reading, means operative to transmit said collimated radiant energy beam from said source to said frequency control, an attenuator with a calibrated indicator disposed in said emergent beam to vary the output power level, means for varying the ratio of movement of said attenuator to the movement of said indicator, a power sensing device disposed in the output radiation, and power indicating means electrically coupled to said power sensing device for providing a continuous indication of absolute power of said beam, whereby a monochromatic signal of known characteristics and power levels is obtained.

17. A source system of radiant energy to be used in infrared signal generators comprising a planar source of radiant energy having a central aperture therein, a first concave parabolic reflector coaxial to and facing said source having a central aperture therein, said first reflector having a radiation gathering surface equal in area to the radiating area of said planar source, a second concave parabolic reflector having a focal point less than the focal point of said first reflector and disposed to the rear of said source and coaxial to and facing the opening therein, said first and second reflectors having a common focal point, radiation collected by said first reflector being reflected to said second reflector through said opening in said source and transmitted by said second reflector in the form of a substantially parallel beam through said opening in said first reflector.

18. A device as in claim 17 wherein said planar source is comprised of a plurality of strands of tape resistance material blackened by a metallic oxide for providing a hot body.

19. A device as in claim 17 further including collimating tube mounted to the rear of said first reflector and adapted to receive the emanating beam through said opening therein, said collimating means having a substantially rectangular output aperture.

20. A source system of radiant energy comprising a source of radiant energy, a first concave parabolic reflector facing said source having a central aperture therein, said first reflector having a radiation gathering surface equal in area to the area of said source, a second concave parabolic reflector coaxial to and facing said first reflector, said first and second reflectors having a common focal point, radiation collected by said first reflector being reflected to said second reflector and transmitted by said second reflector in the form of a substantially parallel beam through said opening in said first reflector.

21. A monochromator device comprising an entrance admitting an entrant beam of collimated radiant energy, an exit, a prism adapted to be rotated, a first reflector oriented to receive and reflect the entrant beam of energy incident to a first face of said prism, said beam passing through said prism and being refracted and dispersed upon leaving a second face of said prism, a second planar reflector positioned with respect to said prism so that the emanating dispersed beam from said second face of said prism impinges thereon and is reflected therefrom, a third reflector oriented to receive and re-reflect a portion of the reflected radiation from said second reflector back to said second reflector, said re-reflected beam reflected from said second reflector being incident to said second face of said prism, said re-reflected beam passing through said prism and emanating from said first face of said prism, said entrant and emergent beams passing through said prism and striking said second reflector being disposed relative to one another so that corresponding rays in each travel in substantially the same vertical planes, means operative to direct a portion of the dispersed beam from said first face of said prism through said exit, and means to rotate said prism and said planar reflector relative to said re-reflective means for selecting the desired band of wave lengths to pass through said exit.

22. A monochromator device comprising an entrance admitting an entrant beam of collimated radiant energy, an exit, a prism adapted to be rotated, means operative to direct said entrant beam incident to a first face of said prism, said beam passing through said prism and being refracted and dispersed upon leaving a second face of said prism, a planar reflector positioned with respect to said prism so that an emanating beam from a second face of said prism impinges thereon and is reflected therefrom, means operative to re-reflect a portion of said reflected radiation back to said planar reflector, said re-reflected beam reflected from said planar reflector being incident to said second face of said prism, said re-reflected beam passing through said prism and emanating from said first face of said prism, means operative to direct a portion of the dispersed beam from said first face of said prism through said exit, and means to rotate said prism relative to said reflective means for selecting the desired band of wave lengths to pass through said exit.

23. A monochromator device having an entrance and exit comprising a source of collimated radiation received through said entrance, a dispersing element, means operative to direct said radiant beam incident to said dispersing element so that said beam is refracted and dispersed upon leaving said dispersing element, means operative to direct a selected narrow bandwidth of said dispersed radiation back to said dispersing element for further dispersion, means operative to direct a range of wave lengths of only a narrow bandwidth of said further dispersed radiant energy beam from said dispersing element through said exit, and means to select the narrow band of wave lengths of the radiation to pass through said exit.

24. An infrared signal generator comprising a source of collimated mixed radiant energy covering a predetermined frequency band, a prism, means operative to pass said collimated beam from said source through said prism for dispersing the radiation therethrough, means oriented to receive and return only a small preselected portion of said dispersed beam to said prism, attenuating means including a pair of opposite plane surfaces having the properties of reflecting and absorbing substantial portions of incident radiant energy, means oriented to transmit as an emergent beam to said attenuating means a portion of the further dispersed beam from said prism, each of said surfaces of said attenuating means being movable relative to one another for controlling the output power of the beam of radiant energy, a calibrated indicator coupled to said attenuator, means for varying the ratio of movement of said plane surfaces of said attenuator unit to the movement of said indicator, power sensing means intercepting a portion of the emergent radiant energy beam, power indicating means electrically coupled to said power sensing means for providing a continuous indication of the absolute power level of the output signal whereby an essentially monochromatic signal of accurately known characteristics and power level is obtained.

References Cited in the file of this patent

UNITED STATES PATENTS

| | | |
|---|---|---|
| 2,517,121 | Liston | Aug. 1, 1950 |
| 2,607,899 | Cary et al. | Aug. 19, 1952 |
| 2,741,691 | Lee | Apr. 10, 1956 |
| 2,827,539 | Smith et al. | Mar. 18, 1958 |
| 2,844,033 | Tandler et al. | July 22, 1958 |
| 2,871,757 | Walsh | Feb. 3, 1959 |
| 2,874,608 | Beloian | Feb. 24, 1959 |
| 2,948,185 | Ward et al. | Aug. 9, 1960 |

UNITED STATES PATENT OFFICE

CERTIFICATE OF CORRECTION

Patent No. 3,080,483 March 5, 1963

David Lawrence Jaffe et al.

It is hereby certified that error appears in the above numbered patent requiring correction and that the said Letters Patent should read as corrected below.

Column 5, line 48, for "if" read -- of --; column 10, line 13, for "used" read -- use --; line 72, for "parts" read -- part --; column 11, line 47, for "ray" read -- rays --; column 12, line 34, for "is", second occurrence, read -- in --; column 13, line 1, for "other" read -- others --; the letter "i" did not print through in the following words: column 14, line 46, -- signals --; line 57, -- facing --; line 68, -- said --; line 72, -- radiation --; column 15, line 23, -- impinge --; line 64, -- calibrated --; column 16, line 10, -- collimated --; column 17, line 33, -- radiation --; line 42, -- temperature-sensitive --.

Signed and sealed this 22nd day of October 1963.

(SEAL)
Attest:

EDWIN L. REYNOLDS

ERNEST W. SWIDER
Attesting Officer

Acting Commissioner of Patents